United States Patent
Yang et al.

(10) Patent No.: US 8,154,888 B2
(45) Date of Patent: *Apr. 10, 2012

(54) OFFLINE SYNCHRONOUS RECTIFIER CIRCUIT WITH TURNED-ON ARBITER AND PHASE-LOCK FOR SWITCHING POWER CONVERTERS

(75) Inventors: Ta-Yung Yang, Milpitas, CA (US);
Chou-Sheng Wang, Keelung (TW);
Pei-Sheng Tsu, Shulin (TW)

(73) Assignee: System General Corporation, Sindian (TW)

( * ) Notice: Subject to any disclaimer, the term of this patent is extended or adjusted under 35 U.S.C. 154(b) by 568 days.

This patent is subject to a terminal disclaimer.

(21) Appl. No.: 12/348,335

(22) Filed: Jan. 5, 2009

(65) Prior Publication Data

US 2010/0172156 A1 Jul. 8, 2010

(51) Int. Cl.
*H02M 3/335* (2006.01)
*H02H 7/122* (2006.01)

(52) U.S. Cl. .................. 363/21.06; 363/56.01

(58) Field of Classification Search ............. 363/16, 363/20, 21.06, 21.14, 56.01
See application file for complete search history.

(56) References Cited

U.S. PATENT DOCUMENTS

| | | | |
|---|---|---|---|
| 6,618,274 B2* | 9/2003 | Boylan et al. | 363/17 |
| 6,781,853 B2* | 8/2004 | Xu et al. | 363/21.06 |
| 8,023,289 B2* | 9/2011 | Yang et al. | 363/21.02 |
| 2007/0263421 A1* | 11/2007 | Kyono | 363/127 |

* cited by examiner

*Primary Examiner* — Matthew Nguyen
(74) *Attorney, Agent, or Firm* — Thomas|Kayden

(57) ABSTRACT

A synchronous rectifier circuit of a switching power converter is provided and includes first and second power transistors and first and second diodes connected to a transformer and an output of the power converter for rectifying. An arbiter circuit generates a lock signal to prevent the second power transistor from being turned on when the first power transistor is turned on. A controller generates a drive signal to control the first power transistor according to an on signal and an off signal. A phase-lock circuit generates the off signal according to the on signal. The on signal is enabled once the first diode is forward biased. The one signal enables the drive signal for turning on the first power transistor. The off signal disables the drive signal for turning off the first power transistor. The off signal is enabled before the disabling of the on signal.

6 Claims, 6 Drawing Sheets

OFFLINE SYNCHRONOUS RECTIFIER CIRCUIT WITH TURNED-ON ARBITER AND PHASE-LOCK FOR SWITCHING POWER CONVERTERS

BACKGROUND OF THE INVENTION

1. Field of the Invention

The present invention relates to power converters, and more particularly, relates to a synchronous rectifier of switching power converters.

2. Description of the Related Art

FIG. 1 shows a circuit schematic of a soft switching power converter. It includes a transformer 10 to provide isolation from line input $V_{IN}$ to the output $V_O$ of the power converter for safety. Switches 20 and 30 develop a half bridge circuit to switch the transformer 10. A leakage inductance of a primary winding $N_P$ of the transformer 10 and capacitors 41, 42 form a resonant tank. The inductance L of the leakage inductance and the equivalent capacitance C of capacitors 41, 42 determine the resonance frequency $f_0$ of the resonant tank.

$$f_0 = \frac{1}{2\pi\sqrt{L \times C}} \quad (1)$$

The transformer 10 transfers the energy from the primary winding $N_P$ to the secondary windings $N_{S1}$ and $N_{S2}$ of the transformer 10. Rectifiers 61, 62 and a capacitor 65 perform the rectifying and filtering to the transformer 10 for generating a DC voltage $V_O$ at the output of the power converter.

Although the soft switching power converter can achieve high efficiency and low EMI (electric-magnetic interference) performance, the forward voltage of rectifiers 61 and 62 still causes significant power losses. The object of present invention is to provide the synchronous rectifying circuit for switching power converter to achieve higher efficiency.

BRIEF SUMMARY OF THE INVENTION

A synchronous rectifier for a switching power converter includes two power transistors and two diodes connected to a transformer and the output of the power converter for the rectifying. An arbiter circuit generates a lock signal to prevent the turn-on of the power transistor when another diode or another power transistor is turned on. A controller generates a drive signal to control the power transistor in response to an on signal and an off signal. A phase-lock circuit is developed to generate the off signal in accordance with the on signal. The on signal is enabled once the diode is forward biased. The one signal is coupled to enable the drive signal for switching on the power transistor. The off signal is coupled to disable the drive signal for switching off the power transistor. The off signal is enabled before the disabling of the on signal.

A maximum-period circuit generates a maximum-period signal coupled to turn off the power transistor for limiting the turned-on time of the power transistor. An inhibit circuit generates an inhibit signal. The inhibit signal is a one-shot signal that coupled to inhibit the turn on of the power transistor after the power transistor is turned off.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The accompanying drawings are included to provide a further understanding of the present invention, and are incorporated in and constitute a part of this specification. The drawings illustrate embodiments of the present invention and, together with the description, serve to explain the principles of the present invention.

Figure 1:
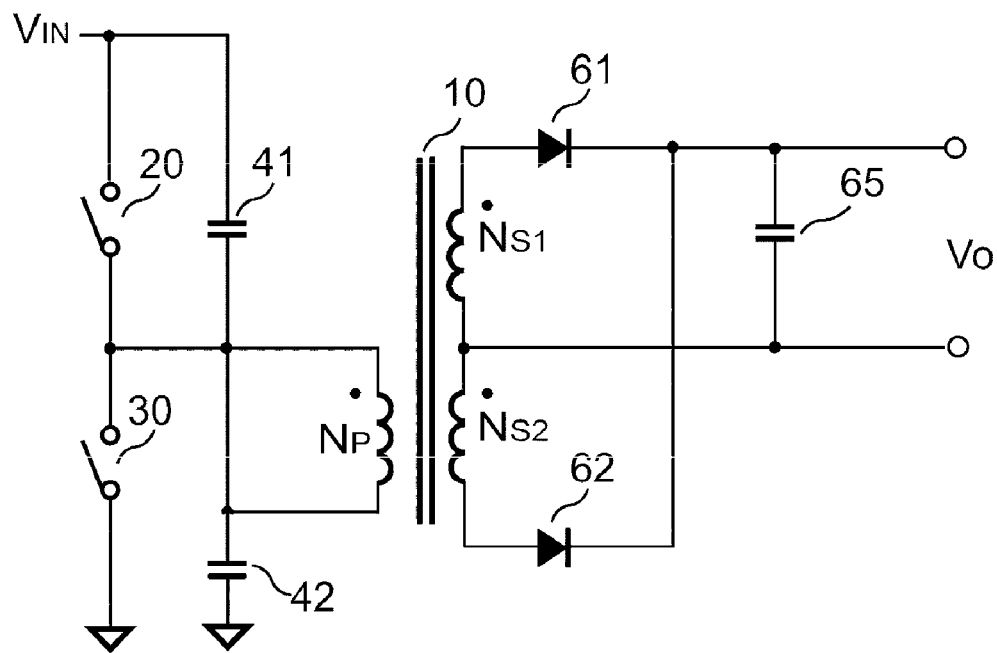
FIG. 1 shows a circuit schematic of a soft switching power converter.
Figure 2:
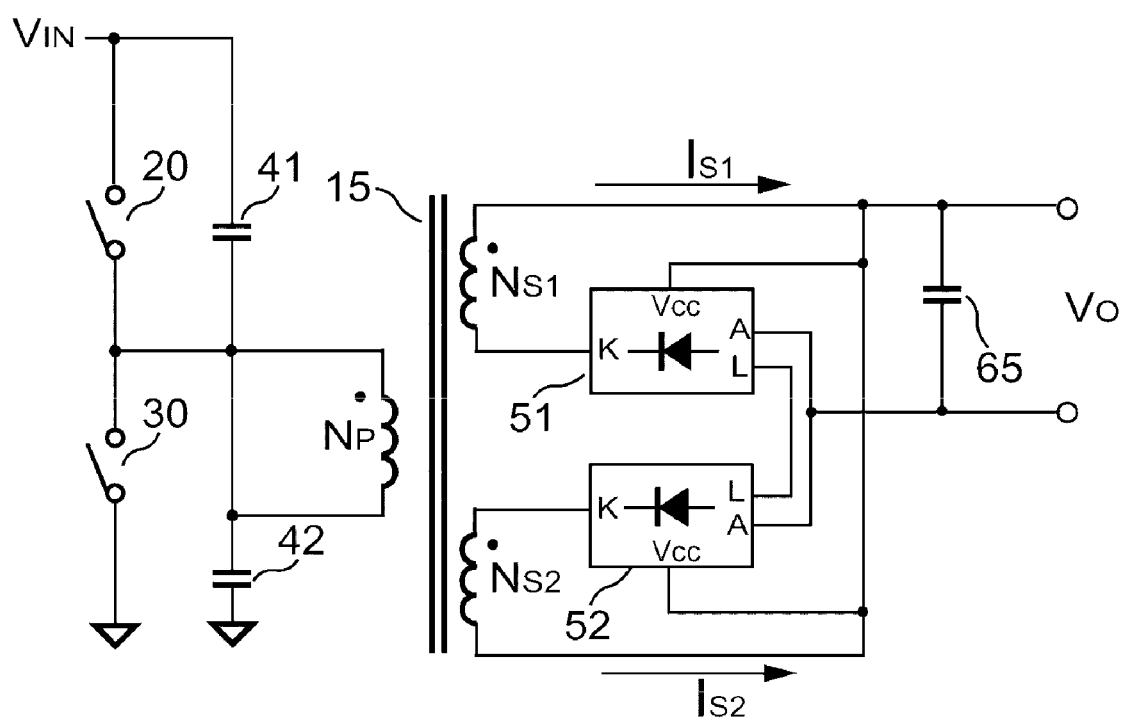
FIG. 2 shows a preferred embodiment of synchronous rectifiers for a switching power converter according to the present invention.

FIG. 2 shows a switching power converter with integrated synchronous rectifier (synchronous rectifying circuit). The power converter includes a transformer 15 having a primary winding $N_P$ and secondary windings $N_{S1}$ and $N_{S2}$. The primary winding $N_P$ of the transformer 15 has two switches 20 and 30 for switching the primary winding $N_P$ of the transformer 15. A synchronous rectifying circuit 51 has a cathode terminal K connected to the secondary winding $N_{S1}$. An anode terminal A of the synchronous rectifying circuit 51 is connected to the output ground of the power converter. Another synchronous rectifying 52 having the cathode terminal K and the anode terminal A is also connected from the secondary winding $N_{S2}$ to the output ground of the power converter.

The synchronous rectifying circuit 51 includes a first power transistor, a first diode and a first control circuit. The synchronous rectifying circuit 52 includes a second power transistor, a second diode and a second control circuit. Synchronous rectifying circuit 51 and 52 generate a lock signal L to prevent synchronous rectifying circuit 51 and 52 from turning on simultaneously. The lock signal L prevents the turn-on of the second power transistor when the first diode or the first power transistor is turned on. Furthermore, the lock signal L prevents the turn-on of the first power transistor when the second diode or the second power transistor is turned on.

Figure 3:
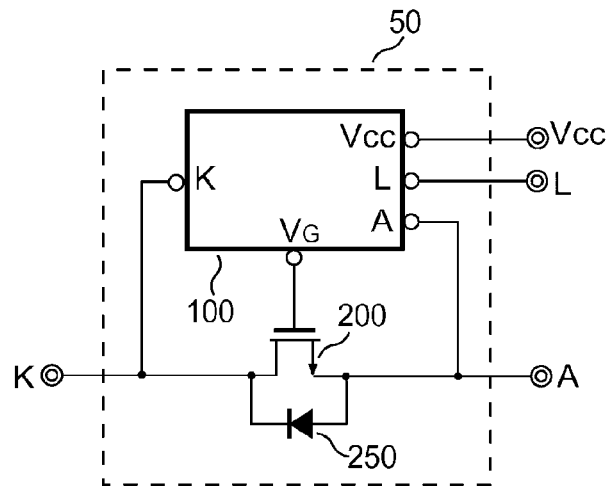
FIG. 3 is a schematic diagram of an integrated synchronous rectifier according to an embodiment of the present invention.

FIG. 3 is the schematic diagram of a synchronous rectifying circuit 50. It represents the circuit of synchronous rectifying circuit 51 or 52. The synchronous rectifying circuit 50 includes a power transistor 200, a diode 250 and a control circuit 100. The control circuit 100 generates a drive signal $V_G$ to control the power transistor 200. The diode 250 is connected to the power transistor 200 in parallel. In the embodiment, the diode 250 is a diode or a parasitic device of the power transistor 200. The power transistor 200 is connected between the cathode terminal K and the anode terminal A. The cathode terminal K is coupled to the secondary winding of the transformer 10. The anode terminal A is coupled to the output ground of the power converter. The control circuit 100 will generate an on signal to enable the drive signal $V_G$ and turn on the power transistor 200 once the diode 250 is forward biased. The control circuit 100 will generate an off signal to disable the drive signal $V_G$ and turn off the power transistor 200 in response the period of the on signal. A lock terminal outputs the lock signal L to show the on/off state of the power transistor 200.

Figure 4:
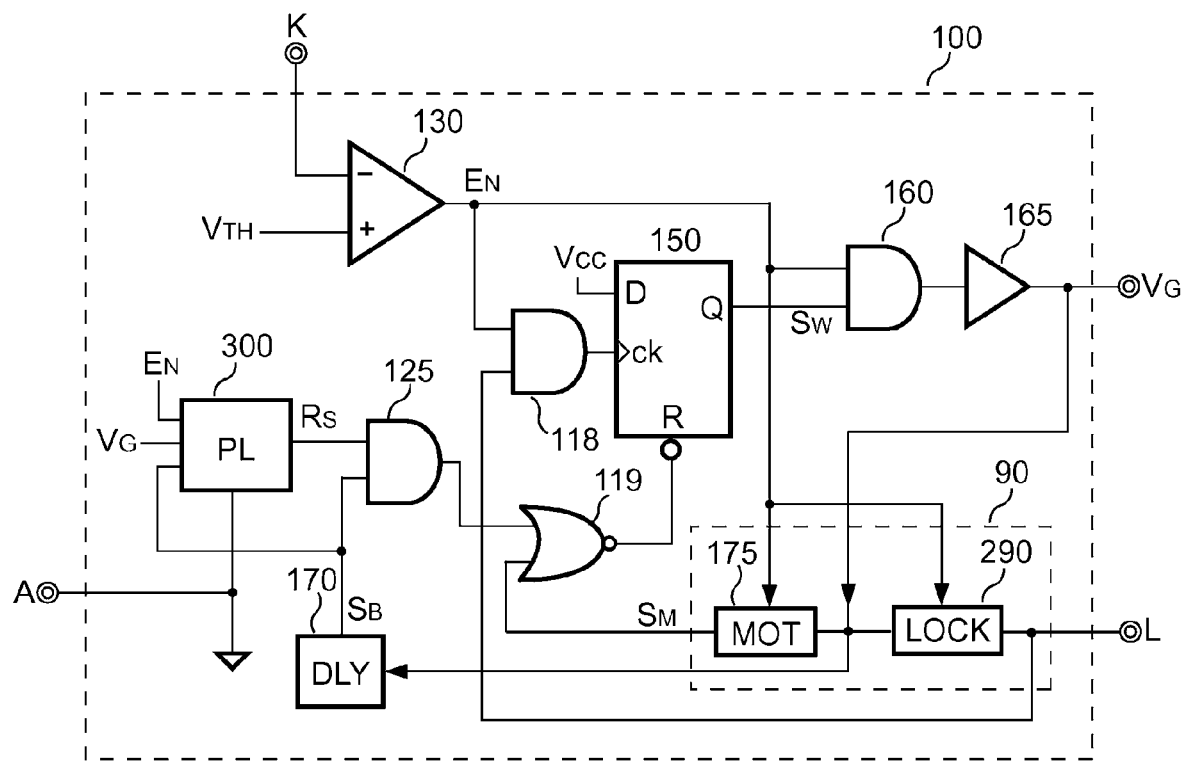
FIG. 4 is a preferred embodiment of a control circuit for the synchronous rectifier according to the present invention.

FIG. 4 shows a schematic diagram of a preferred embodiment of the control circuit 100. It includes a phase-lock circuit (PL) 300, an arbiter circuit 90 and a controller. The controller is developed by a flip-flip 150, a comparator 130, a delay circuit (DLY) 170, a NOR gate 119, AND gates 125, 118, 160 and an output buffer 165.

The comparator 130 has a threshold $V_{TH}$ connects to its positive input. The negative input of the comparator 130 is coupled to the cathode terminal K. The output of comparator 130 generates the on signal $E_N$. Through the AND gate 118, the on signal $E_N$ and the lock signal L are coupled to the clock-input terminal ("CK") of the flip-flop 150. Therefore, the drive signal $V_G$ can only be enabled once the lock signal L is disabled (high level). The reset-input terminal ("R") of the flip-flop 150 is controlled by the output of the NOR gate 119. The output (signal $S_W$) of the flip-flop 150 and the on signal $E_N$ are connected to the AND gate 160. The flip-flop 150 is operated as a latch circuit. The output of the AND gate 160 is connected to the output buffer 165. The drive signal $V_G$ is generated at the output of the output buffer 165 for controlling the power transistor 200.

The arbiter circuit 90 includes a lock circuit (LOCK) 290 and a detection circuit (MOT) 175. The lock circuit 290 generates the lock signal L. The detection circuit 175 generates a reset signal $S_M$ to turn off the drive signal $V_G$ and the power transistor 200 under abnormal conditions. The reset signal $S_M$ is coupled to the reset-input terminal ("R") of the flip-flop 150 through the NOR gate 119 to clear (or called reset) the flip-flop 150.

The drive signal $V_G$ will be generated to turn on the power transistor 200 once the voltage of the cathode terminal K is lower than the threshold voltage $V_{TH}$. Another input of the NOR gate 119 is connected to the output of an AND gate 125. The first input of the AND gate 125 is coupled to receive the output signal (blanking signal $S_B$) of a delay circuit 170. The input of the delay circuit 170 is connected to the drive signal $V_G$. The delay circuit 170 provides a blanking time to achieve a minimum on time for the drive signal $V_G$. A phase-lock circuit 300 generates an off signal $R_S$ to the second input of the AND gate 125. The off signal $R_S$ is generated in response to the on signal $E_N$. The off signal $R_S$ is developed to turn off of the drive signal $V_G$. The voltage of the cathode terminal K will be lower than the voltage of the threshold $V_{TH}$ when the diode 250 is conducted and forward biased. Therefore, the power transistor 200 can only be turned on after the diode 250 is turned on, which achieves the soft-switching of the power transistor 200. Furthermore, the drive signal $V_G$ will be disabled and the power transistor 200 will be turned off when the diode 250 is reversely biased. Furthermore, the off signal $R_S$ is coupled to turn off the power transistor 200 in accordance with the operation of the phase-lock circuit 300.

Figure 5:
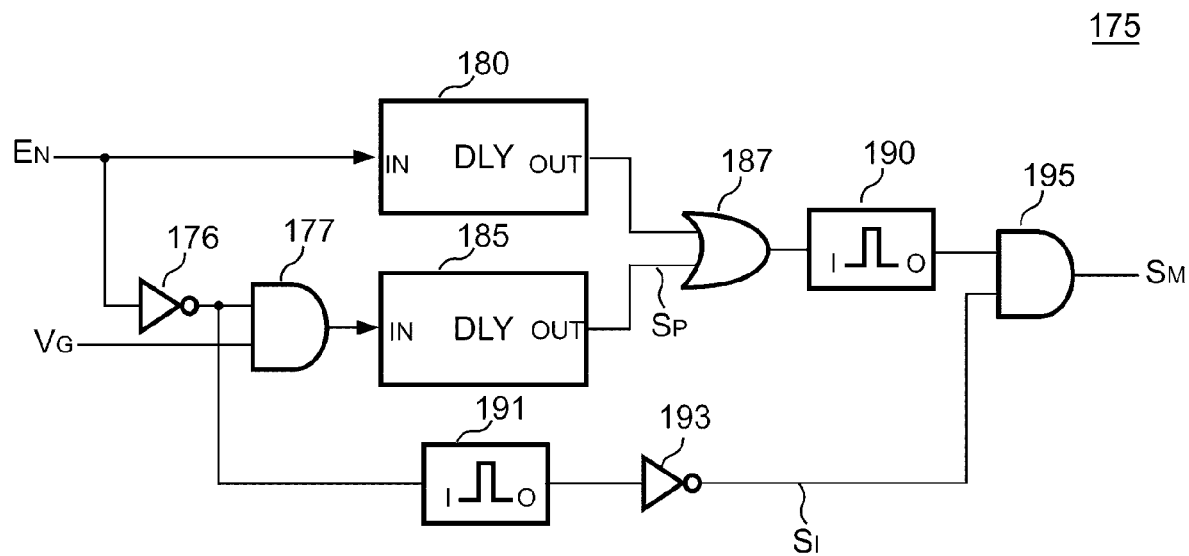
FIG. 5 is a circuit schematic of a detection circuit according to the present invention.

FIG. 5 shows the circuit schematic of the detection circuit 175. It includes a maximum-period circuit, a inhibit circuit and a protection circuit. The maximum-period circuit is formed by a delay circuit (DLY) 180 in the embodiment. The protection circuit is formed by an AND gate 177 and a delay circuit (DLY) 185. The inhibit circuit is developed by a pulse generation circuit 191 in the embodiment. The on signal $E_N$ is transmitted to the input of the delay circuit 180. The delay circuit 180 generates a maximum-period signal connected to an input of an OR gate 187. The on signal $E_N$ is further coupled to an input of the AND gate 177 through an inverter 176. Another input of the AND gate 177 is coupled to receive the drive signal $V_G$. The output of the AND gate 177 is connected to the delay circuit 185. The delay circuit 185 generates a protection signal to another input of the OR gate 187. The output of the OR gate 187 is coupled to trigger a pulse generation circuit 190. The output of the pulse generation circuit 190 is connected to an input of an AND gate 195. The on signal $E_N$ is further coupled to the input the pulse generation circuit 191 through the inverter 176. The pulse generation circuit 191 coupled to generate an inhibit signal $S_I$ to another input of the AND gate 195 via an inverter 193. The AND gate 195 generates a reset signal $S_M$ to turn off the drive signal $V_G$. Therefore, the maximum-period signal is coupled to turn off the power transistor 200 for limiting the turned-on time of the power transistor 200. The inhibit signal $S_I$ is coupled to inhibit the turning on of the power transistor 200 after the power transistor 200 is turned off. The inhibit signal is a one-shot signal. The pulse width of the one-shot signal is controlled by the pulse generation circuit 191. The protection signal $S_P$ is also coupled to turn off the power transistor 200 for limiting the current of the power transistor 200 during the abnormal condition.

Figure 6:
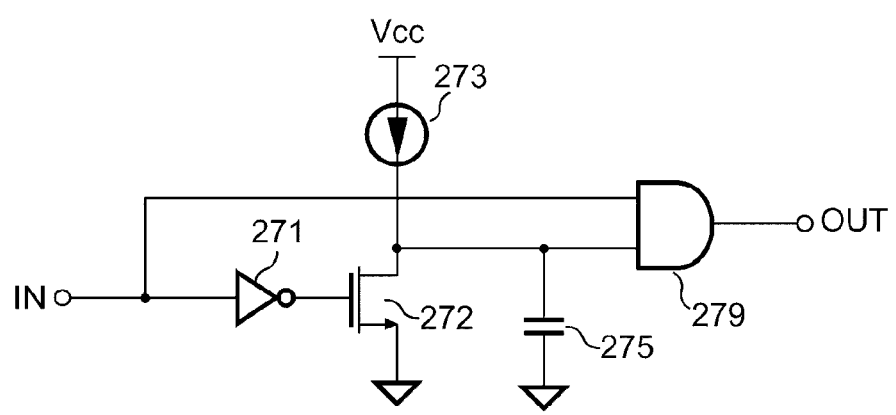
FIG. 6 is a circuit schematic of a delay circuit according to an embodiment of the present invention.

FIG. 6 is the circuit schematic of the delay circuit 180,185 shown in FIG. 5. A current source 273 is connected to charge a capacitor 275. A transistor 272 is connected to discharge the capacitor 275. An input signal IN is connected to control the transistor 272 through an inverter 271. The input signal IN is further connected to an input of an AND gate 279. Another input of the AND gate 279 is coupled to the capacitor 275. Once the input signal IN is enabled, the output signal OUT is generated from the output of the AND gate 279 after a delay time. The delay time is determined by the current of the current source 273 and the capacitance of the capacitor 275.

Figure 7:
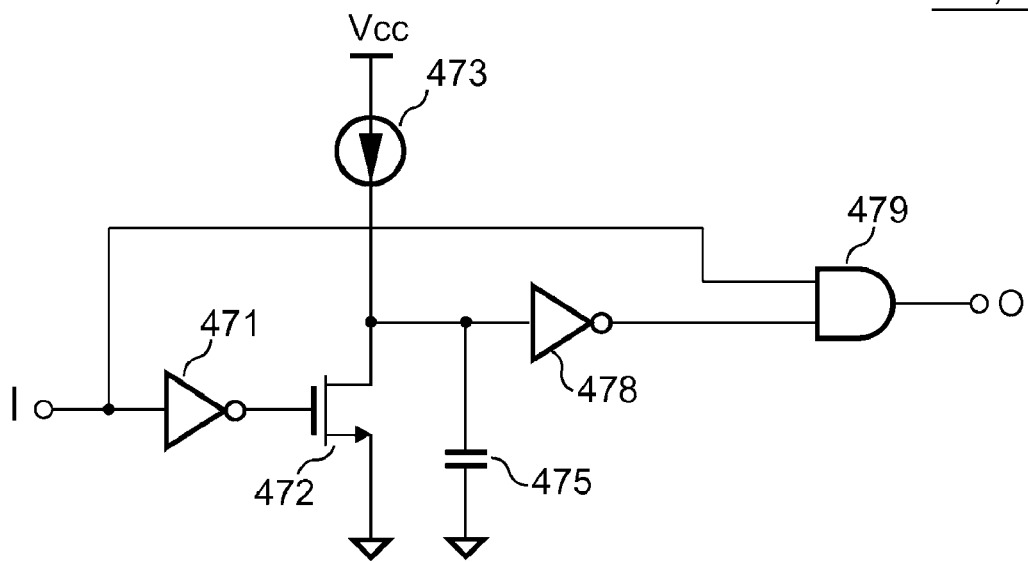
FIG. 7 is a pulse generation circuit.

FIG. 7 shows the pulse generation circuits 190,191 shown in FIG. 5. A current source 473 is connected to charge a capacitor 475. A transistor 472 is connected to discharge the capacitor 475. A signal I is coupled to control the transistor 472 through an inverter 471. The signal I is further transmitted to an input of an AND gate 479. Another input of the AND gate 479 is coupled to the capacitor 475 via an inverter 478. The pulse width of the output pulse signal is determined by the current of the current source 473 and the capacitance of the capacitor 475.

Figure 8:
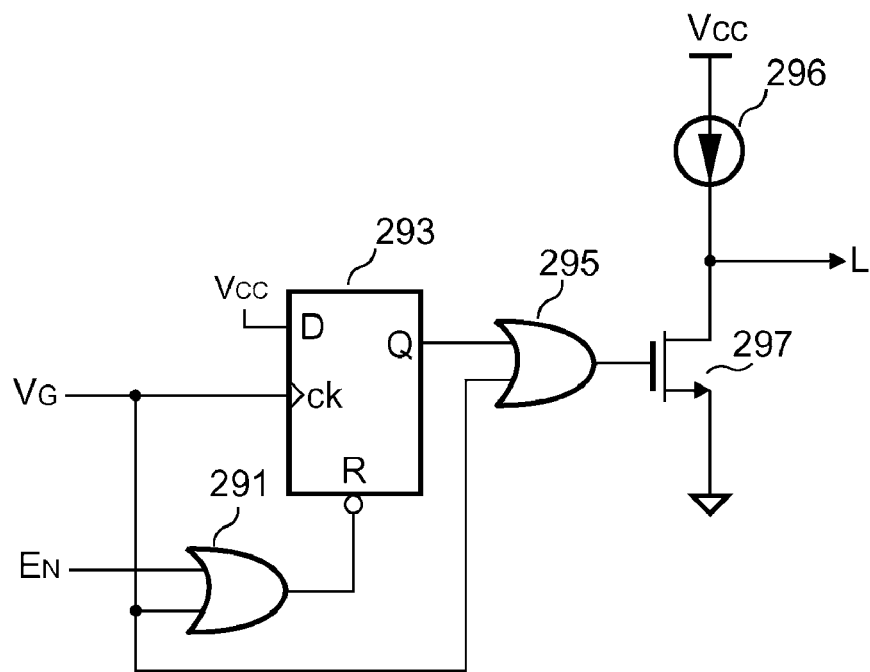
FIG. 8 is a lock circuit according to a preferred embodiment of the present invention.

FIG. 8 is the schematic of the lock circuit 290. A flip-flop 293 is turned on by the drive signal $V_G$ from another synchronous rectifying circuit 50. The drive signal $V_G$ and the on signal $E_N$ are coupled to an OR gate 291. The output of the OR gate 291 is connected to reset the flip-flop 293. The output of the flip-flop 293 is connected to an input of an OR gate 295. Another input of the OR gate 295 is coupled to receive the drive signal $V_G$. The output of the OR gate 295 drives a transistor 297. The transistor 297 generates the lock signal L. A current source 296 provides a pull high for the lock signal L. The lock signal L is generated (low level) in response to the enabling of the drive signal $V_G$. The lock signal L will be disabled (pull high level) when the drive signal $V_G$ and the on signal $E_N$ are disabled. The drive signal $V_G$ can only be initiated and enabled once the lock signal L is disabled (pull high level).

Figure 9:
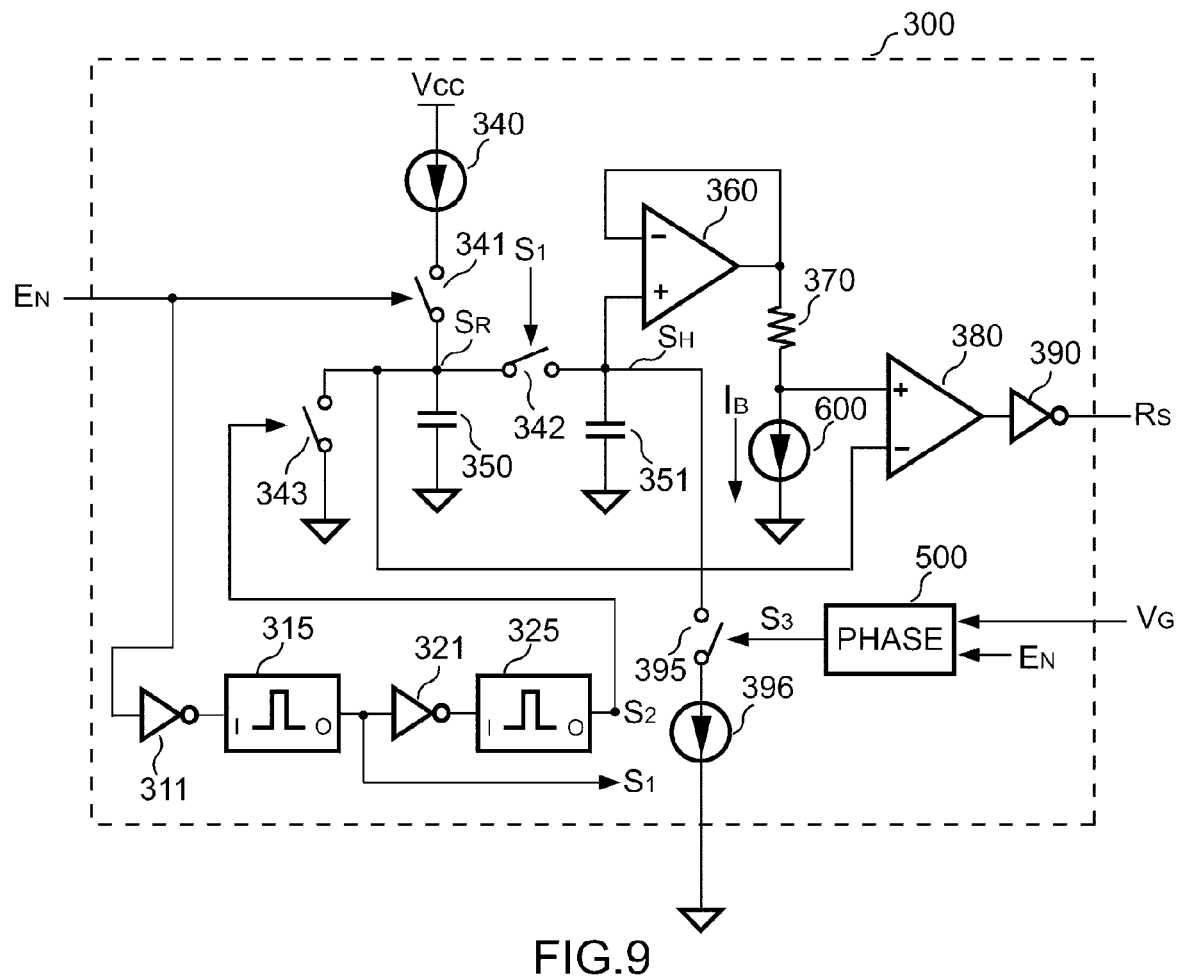
FIG. 9 is a phase-lock circuit according to a preferred embodiment of the present invention.

FIG. 9 is the schematic of the phase-lock circuit 300. The on signal $E_N$ is coupled to enable the charge of a capacitor 350 through a switch 341 and a current source 340. A ramp signal $S_R$ is thus generated at the capacitor 350. The on signal $E_N$ is further coupled to generate a sample signal $S_1$ through an inverter 311 and a pulse generation circuit 315, and then generates a clear signal $S_2$ through an inverter 321 and a pulse generation circuit 325. The sample signal $S_1$ is coupled to sample the signal of the capacitor 350 to a capacitor 351 via a switch 342. A hold signal $S_H$ is thus generated in the capacitor 351. After the sampling, the clear signal $S_2$ is coupled to clear the capacitor 350 through a switch 343. The level of the hold signal $S_H$ of the capacitor 351 is correlated to the enabling period of the on signal $E_N$. The hold signal $S_H$ of the capacitor 351 is coupled to an input of a comparator 380 through a buffer amplifier 360 and a resistor 370. A current source 600 is further coupled to the resistor 370 to generate a voltage drop at the resistor 370. Another input of the comparator 380 is connected to the ramp signal $S_R$. The output of the comparator 380 is connected to an inverter 390. The inverter 390 generates the off signal $R_S$ to disable the drive signal $V_G$. The current $I_B$ of the current source 600 is adjusted to generate the off signal $R_S$. In additional, a current source 396 is coupled to discharge the capacitor 351 and decrease the level of the hold signal via a switch 395. A phase detector (PHASE) 500 generates a restart signal $S_3$ to enable the switch 395 for the discharge when an error phase signal is detected. The phase detector 500 is utilized to detect an enough timing margin between the disabling of the drive signal $V_G$ and the disabling of the on signal $E_N$. The on signal $E_N$ is required to keep the enabling after the drive signal $V_G$ is turned off. It means when the power transistor 200 is turned off, the diode 250 is required to keep turned on for a period (50-100 nsec) to ensure the synchronous rectifying operated properly. The restart signal $S_3$ is thus generated to decrease the hold signal $S_H$ when the diode 250 does not keep turned on for a period after the power transistor 200 is turned off.

Figure 10:
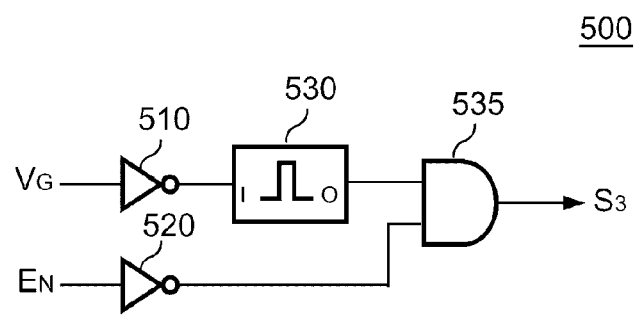
FIG. 10 is a phase detector according to a preferred embodiment of the present invention.

FIG. 10 is the circuit of the phase detector 500. The drive signal $V_G$ is coupled to enable a pulse generation circuit 530 through an inverter 510. The output of the pulse generation circuit 530 is connected to an input of an AND gate 535. Another input of the AND gate 535 is coupled to receive the on signal $E_N$ via an inverter 520. The output of the AND gate generates the restart signal $S_3$.

Figure 11:
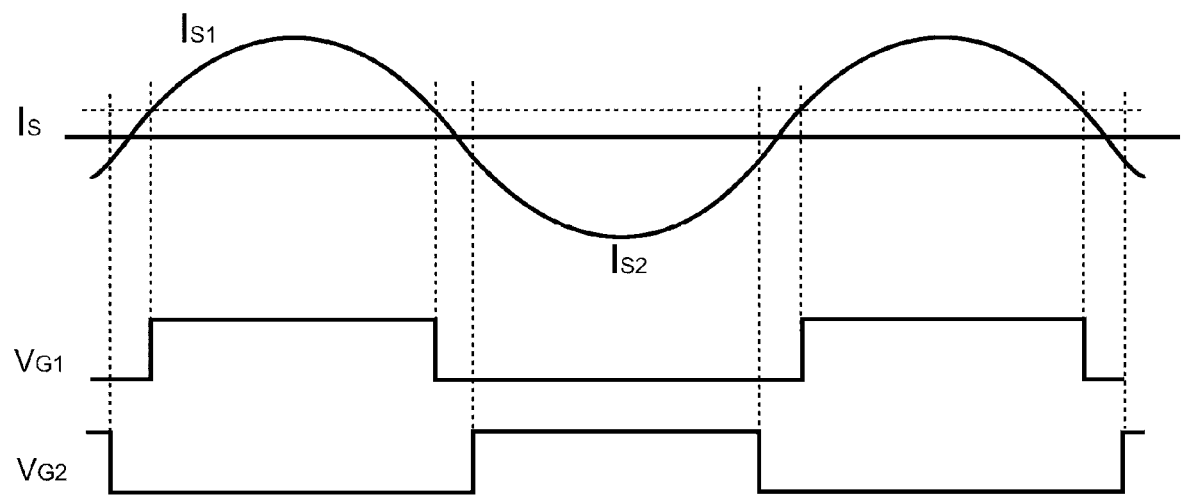
FIG. 11 shows key waveforms of synchronous rectifiers according to the present invention.

FIG. 11 shows key waveforms of the synchronous rectifying circuit. The switching current $I_S$ of the transformer 10 includes $I_{S1}$ and $I_{S2}$. The drive signals $V_{G1}$ and $V_{G2}$ are the drive signal $V_G$ of the synchronous rectifying circuit 51 and the synchronous rectifying circuit 52 respectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A synchronous rectifier circuit of a switching power converter, comprising:
   a power transistor and a diode coupled to a transformer and an output of the switching power converter for rectifying;
   a controller generating a drive signal to control the power transistor in response to an on signal and an off signal; and
   a phase-lock circuit generating the off signal in accordance with the on signal;
   wherein the on signal is enabled once the diode is forward biased; and
   wherein the on signal is coupled to enable the drive signal for turning on the power transistor, and the off signal is coupled to disable the drive signal for turning off the power transistor;
   wherein the phase-lock circuit comprises:
   a charging circuit generating a ramp signal when the on signal is enabled; and
   a sampled circuit generating a hold signal in accordance with the level of the ramp signal;
   a comparator generating the off signal in response to comparison of the ramp signal and the hold signal;
   wherein the level of the hold signal is correlated to the period of the on signal.

2. The synchronous rectifier circuit as claimed in claim 1 further comprising:
   a lock circuit generating a lock signal in response to the enabling of the drive signal;
   wherein the lock signal is disabled in response to the disabling of the on signal, and the drive signal can only be enabled once the lock signal is disabled.

3. The synchronous rectifier as claimed in claim 1, wherein the off signal is enabled before the disabling of the on signal.

4. The synchronous rectifier circuit as claimed in claim 1, wherein the controller comprises:
   a latch circuit generating the drive signal to control of the power transistor;
   wherein the drive signal is enabled in response to the enabling of the on signal, and the drive signal is disabled in response to the enabling of the off signal.

5. The synchronous rectifier circuit as claimed in claim 1 further comprising:
   a maximum-period circuit generating a maximum-period signal;
   wherein the maximum-period signal is coupled to turn off the power transistor for limiting the maximum period of the power transistor.

6. The synchronous rectifier circuit as claimed in claim 1 further comprising:
   an inhibit circuit generating an inhibit signal;
   wherein the inhibit signal is a one-shot signal that coupled to inhibit the turning on of the power transistor after the power transistor is turned off.

* * * * *